US007884496B2

United States Patent
Li et al.

(10) Patent No.: US 7,884,496 B2
(45) Date of Patent: Feb. 8, 2011

(54) LARGE POWER MULTI-OUTPUTS POWER SUPPLY STRUCTURE HAVING RELATIVELY HIGH EFFICIENCY IN LOAD RANGE AND CONTROLLING METHOD THEREOF

(75) Inventors: Fei Li, Shanghai (CN); Hongjian Gan, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 174 days.

(21) Appl. No.: 12/147,797

(22) Filed: Jun. 27, 2008

(65) Prior Publication Data

US 2009/0174257 A1 Jul. 9, 2009

(30) Foreign Application Priority Data

Jan. 4, 2008 (TW) ................ 97100502 A

(51) Int. Cl.
*H02J 3/14* (2006.01)
(52) U.S. Cl. .......................................... 307/31; 307/17
(58) Field of Classification Search ................... 307/17, 307/31; 363/65, 69, 15, 20, 21.06
See application file for complete search history.

(56) References Cited

U.S. PATENT DOCUMENTS

| 6,301,129 | B1 * | 10/2001 | Yasumura | ............... 363/21.03 |
|---|---|---|---|---|
| 6,317,337 | B1 * | 11/2001 | Yasumura | ............... 363/21.04 |
| 6,987,679 | B2 * | 1/2006 | Gan et al. | ............... 363/89 |
| 7,501,715 | B2 * | 3/2009 | Saeueng et al. | ............... 307/34 |
| 2002/0080635 | A1 * | 6/2002 | Yasumura | ............... 363/97 |
| 2002/0131282 | A1 * | 9/2002 | Takegami | ............... 363/97 |
| 2003/0218384 | A1 * | 11/2003 | Yoneda | ............... 307/19 |
| 2004/0233685 | A1 * | 11/2004 | Matsuo et al. | ............... 363/65 |
| 2005/0179324 | A1 * | 8/2005 | Petricek | ............... 307/44 |
| 2008/0298093 | A1 * | 12/2008 | Jin et al. | ............... 363/21.06 |

\* cited by examiner

*Primary Examiner*—Jared J Fureman
*Assistant Examiner*—Daniel Cavallari
(74) *Attorney, Agent, or Firm*—Volpe and Koenig, P.C.

(57) ABSTRACT

The configurations of a switched-mode power supply and a controlling method thereof are provided. The proposed switched-mode power supply includes a first output converter receiving a DC input voltage and generating a first high power DC voltage output and at least one low power DC voltage output, and a second output converter receiving the DC input voltage and generating a second high power DC voltage output coupled to the first high power DC voltage output to generate a coupled output, wherein the first output converter works and the second output converter idles when a transient power of the coupled output is not larger than a rated output power of the first high power DC voltage output, and both the first and the second output converters work when the transient power is larger than the rated output power.

15 Claims, 9 Drawing Sheets

LARGE POWER MULTI-OUTPUTS POWER SUPPLY STRUCTURE HAVING RELATIVELY HIGH EFFICIENCY IN LOAD RANGE AND CONTROLLING METHOD THEREOF

FIELD OF THE INVENTION

The present invention relates to a switched-mode power supply. More particularly, the present invention relates to a power supply having a parallelized structure including a multi-outputs converter and a single-output converter with a relatively high efficiency in a wide load range and a controlling method thereof.

BACKGROUND OF THE INVENTION

Recently, the worldwide energy crisis is becoming even more serious. Thus fully utilizing energy resource and decrease the energy waste becomes more and more urgent. In the consumer electronic products, the desktop computers and the workstation computers occupy a quite large percentage, and the low efficiency of the switched-mode power supply of these products has brought a great deal of energy waste. For that matter, Energy Star increases the forced efficiency standard to more than 80% when switched-mode power supply for the desktop computers and the workstation computers load from 20% to 100% since Jul. 20, 2007. Therefore, the design of a switched-mode power supply with high efficiency in a wide load range is desired.

The switched-mode power supply of the desktop computers and the workstation computers usually has a multi-outputs structure, and the output voltages of which include +12 V, +5 V, and +3.3 V in general. FIG. 1 shows a circuit diagram of a DC/DC converter stage of a desktop computer in the prior art. In FIG. 1, the DC/DC converter stage 1 includes an inverter, a transformer T having a primary winding Np coupled to the inverter, a first secondary winding Ns1 and a second secondary winding Ns2, a rectifier coupled to the first secondary winding Ns1, a first filter (including a first inductor L1 and a first capacitor C1) and a second filter (including a second inductor L2 and a second capacitor C2) both coupled to the rectifier and respectively employed to generate output voltages of +12 V and +5 V, a post regulator coupled to a node of the first secondary winding Ns1 and the second secondary winding Ns2, and generating an output voltage of +3.3 V and a control circuit coupled to the inverter, receiving output voltages of +12 V and +5 V and generating a control signal (not shown). In a desktop computer (as shown in FIG. 1), the DC/DC converter stage usually employs output voltages of +12 V and +5 V coupled to each other via an inductor and the weighted feedback of the two output voltages to accomplish the regulation of the two output voltages. The regulation of output voltage of +3.3 V is accomplished through an independent feedback. This kind of structure has the advantage of having a lower cost.

The rated power of a workstation computer is relatively higher (usually larger than 500 W), therefore, the output power of the +12 V output terminal of which is relatively higher too. If the structure of FIG. 1 is employed, it will cause two problems: 1. Due to the influence of the parasitic parameters of the coupled inductor between the outputs of +12 V and +5 V, the weighted feedback of two output voltages of +12 V and +5 V will interact each other and the output voltages can't be regulated stably, this is the cross regulation problem; 2. A single transformer bearing the whole output power raises the difficulty of heat dissipation design.

Thus, the switched-mode power supply in the workstation computer usually will employ a structure as shown in FIG. 2. FIG. 2 shows a circuit diagram of a DC/DC converter stage of a workstation computer in the prior art. In FIG. 2, the DC/DC converter stage 2 includes a first inverter, a first transformer T1 having a first primary winding N1$p$ coupled to the first inverter, a first secondary winding N1$s$1 and a second secondary winding N1$s$2, a first rectifier coupled to the first secondary winding N1$s$1 and generating an output voltage of +5 V, a post regulator coupled to a node of the first secondary winding N1$s$1 and the second secondary winding N1$s$2, and generating an output voltage of +3.3 V, a first control circuit coupled to the first inverter, receiving the output voltage of +5 V and generating a first control signal (not shown), a second inverter, a second transformer T2 having a second primary winding N2$p$ coupled to the second inverter and a third secondary winding N2$s$, a second rectifier coupled to the third secondary winding N2$s$ and generating an output voltage of +12 V and a second control circuit coupled to the second inverter, receiving the output voltage of +12 V and generating a second control signal (not shown). The output voltage of +12 V accomplishes the closed-loop regulation of output voltage via the independent transformer T2 and the second rectifier. The output voltages of +5 V and +3.3 V commonly employ the same transformer T1, the output voltage of +5 V accomplishes the regulation of output voltage via the closed-loop feedback, and the output voltage of +3.3 V accomplishes the regulation of output voltage via another closed-loop feedback. Since the three output voltages are regulated through three respectively independent closed-loop feedbacks, therefore, there is not any cross regulation problem. Employing two transformers could make heat-dissipation design easier. Due to the different output voltages of the two transformers, the two transformers are independent from each other, and both are always working in the whole load range, thus the efficiency of the DC/DC converter stage in light load is not very high.

Keeping the drawbacks of the prior arts in mind, and employing experiments and research full-heartily and persistently, the applicant finally conceived a large power multi-outputs power supply structure having a relatively high efficiency in a load range and a controlling method thereof.

SUMMARY OF THE INVENTION

It is therefore an object of the present invention to provide a large power switched-mode power supply, the power supply has a relatively high efficiency in a load rang, and it employs a parallelized structure including a multi-outputs converter and a single-output converter, effectively increases the light-load efficiency of the power supply, and resolves the heat dissipation problem of the transformers and the cross regulation problem of the multi-outputs converters.

According to the first aspect of the present invention, a switched-mode power supply includes a first output converter receiving a DC input voltage and generating a first high power DC voltage output and at least one low power DC voltage output, and a second output converter receiving the DC input voltage and generating a second high power DC voltage output coupled to the first high power DC voltage output to generate a coupled output, wherein the first output converter works and the second output converter idles when a transient power of the coupled output is not larger than a rated output power of the first high power DC voltage output, and both the first and the second output converters work when the transient power is larger than the rated output power.

Preferably, the power supply further includes a resistive element having a first and a second terminals respectively coupled to the first and the second output converters.

Preferably, the first output converter generates an output power momentarily dropping to a current limiting output power when the transient power of the coupled output is larger than the rated output power, and an output power of the second output converter equals to a difference between the transient power of the coupled output and the current limiting output power when the second output converter is turned on.

Preferably, the first output converter is a multi-outputs converter, the second output converter is a single-output converter, the at least one low power DC voltage output includes a first low power DC voltage output and a second low power DC voltage output, and the multi-outputs converter includes a first control circuit receiving the first high power DC voltage output and the first low power DC voltage output, and generating a first control signal, a first inverter receiving the DC input voltage and the first control signal, and generating a first AC output voltage, a first transformer having a first primary winding, a first secondary winding and a second secondary winding, wherein the first primary winding is coupled to the first inverter, each of the first and the second secondary windings has a first and a second terminals, the first terminal of the second secondary winding is coupled to the second terminal of the first secondary winding, and the second terminal of the second secondary winding is grounded, a first rectifier coupled to the first and the second terminals of the first secondary winding, a post regulator coupled to the second terminal of the first secondary winding and generating the second low power DC voltage output, a first filter coupled to the first rectifier and generating the first high power DC voltage output, and a second filter coupled to the first rectifier and generating the first low power DC voltage output.

Preferably, the first filter includes a first capacitor and a first inductor, the second filter includes a second capacitor and a second inductor, the first inductor is magnetically coupled to the second inductor, and both the multi-outputs and the single-output converters are DC/DC converters.

Preferably, the single-output converter includes a second control circuit receiving the second high power DC voltage output and generating a second control signal, a second inverter receiving the DC input voltage and the second control signal, and generating a second AC output voltage, a second transformer having a second primary winding and a third secondary winding, wherein the second primary winding is coupled to the second inverter, the third secondary winding has a first and a second terminals, and the second terminal of the third secondary winding is grounded, and a second rectifier coupled to the first terminal of the third secondary winding and generating the second high power DC voltage output.

Preferably, the first and the second inverters are both half-bridge converters, and the first and the second rectifiers are both half-wave rectifiers.

According to the second aspect of the present invention, a switched-mode power supply includes a first output converter receiving an input voltage and generating a first high power voltage output, and a second output converter receiving the input voltage and generating a second high power voltage output coupled to the first high power voltage output to generate a coupled output, wherein the first output converter works and the second output converter idles when a transient power of the coupled output is not larger than a rated output power of the first high power voltage output, and both the first and the second output converters work when the transient power is larger than the rated output power.

Preferably, the power supply further includes a resistive element having a first and a second terminals respectively coupled to the first and the second output converters, wherein an output power of the first output converter momentarily drops to a current limiting output power when the transient power of the coupled output is larger than the rated output power, and an output power of the second output converter equals to a difference between the transient power of the coupled output and the current limiting output power when the second output converter is turned on.

Preferably, the power supply further includes a first and a second low power voltage outputs, wherein the first output converter is a multi-outputs converter, the second output converter is a single-output converter, and the multi-outputs converter includes a first control circuit receiving the first high power voltage output and the first low power voltage output, and generating a first control signal, a first inverter receiving the input voltage and the first control signal and generating a first AC output voltage, a first transformer having a first primary winding, a first secondary winding and a second secondary winding, wherein the first primary winding is coupled to the first inverter, each of the first and the second secondary windings has a first and a second terminals, the first terminal of the second secondary winding is coupled to the second terminal of the first secondary winding, and the second terminal of the second secondary winding is grounded, a first rectifier coupled to the first and the second terminals of the first secondary winding, a post regulator coupled to the second terminal of the first secondary winding and generating the second low power voltage output, a first filter coupled to the first rectifier and generating the first high power voltage output, and a second filter coupled to the first rectifier and generating the first low power voltage output.

Preferably, the first filter includes a first capacitor and a first inductor, the second filter includes a second capacitor and a second inductor, and the first inductor is magnetically coupled to the second inductor.

Preferably, the single-output converter includes a second control circuit receiving the second high power voltage output and generating a second control signal, a second inverter receiving the input voltage and the second control signal, and generating a second AC output voltage, a second transformer having a second primary winding and a third secondary winding, wherein the second primary winding is coupled to the second inverter, the third secondary winding has a first and a second terminals, and the second terminal of the third secondary winding is grounded, and a second rectifier coupled to the first terminal of the third secondary winding and generating the second high power voltage output.

Preferably, the input voltage is a DC input voltage, the first and the second high power voltage outputs are both high power DC voltage outputs, and the first and the second low power voltage outputs are both low power DC voltage outputs.

According to the third aspect of the present invention, a controlling method for a switched-mode power supply including a first output converter generating a first high power voltage output and a second output converter generating a second high power voltage output coupled to the first high power voltage output to generate a coupled output includes steps of: causing the first output converter to work and the second output converter to idle when a transient power of the coupled output is not larger than a rated output power of the first high power voltage output; and causing both the first and the second output converters to work when the transient power is larger than the rated output power.

Preferably, the switched-mode power supply further includes a resistor having a first and a second terminals respectively coupled to the first and the second output converters, both the first and the second output converters receive an input voltage, and the method further includes steps of: causing the first output converter to generate a first and a second low power voltage outputs; causing an output power of the first output converter to momentarily drop to a current-limiting output power when the transient power of the coupled output is larger than the rated output power; and causing an output power of the second output converter to equal to a difference between the transient power of the coupled output and the current limiting output power when the second output converter is turned on.

Preferably, the input voltage is a DC input voltage, the first and the second high power voltage outputs are both high power DC voltage outputs, and the first and the second low power voltage outputs are both low power DC voltage outputs.

Preferably, the first output converter is a multi-outputs converter, and the second output converter is a single-output converter.

Preferably, the switched-mode power supply further includes a resistor having a first and a second terminals respectively coupled to the first and the second output converters, both the first and the second output converters receive an input voltage, the first and the second high power voltage outputs are both high power DC voltage outputs, and the method further includes a step of: causing the first output converter to generate at least one low power voltage output.

Preferably, the input voltage is a DC input voltage and the at least one low power voltage output comprises a first and a second low power voltage outputs.

The present invention may best be understood through the following descriptions with reference to the accompanying drawings, in which:

DETAILED DESCRIPTION OF THE PREFERRED EMBODIMENT

Figure 1:
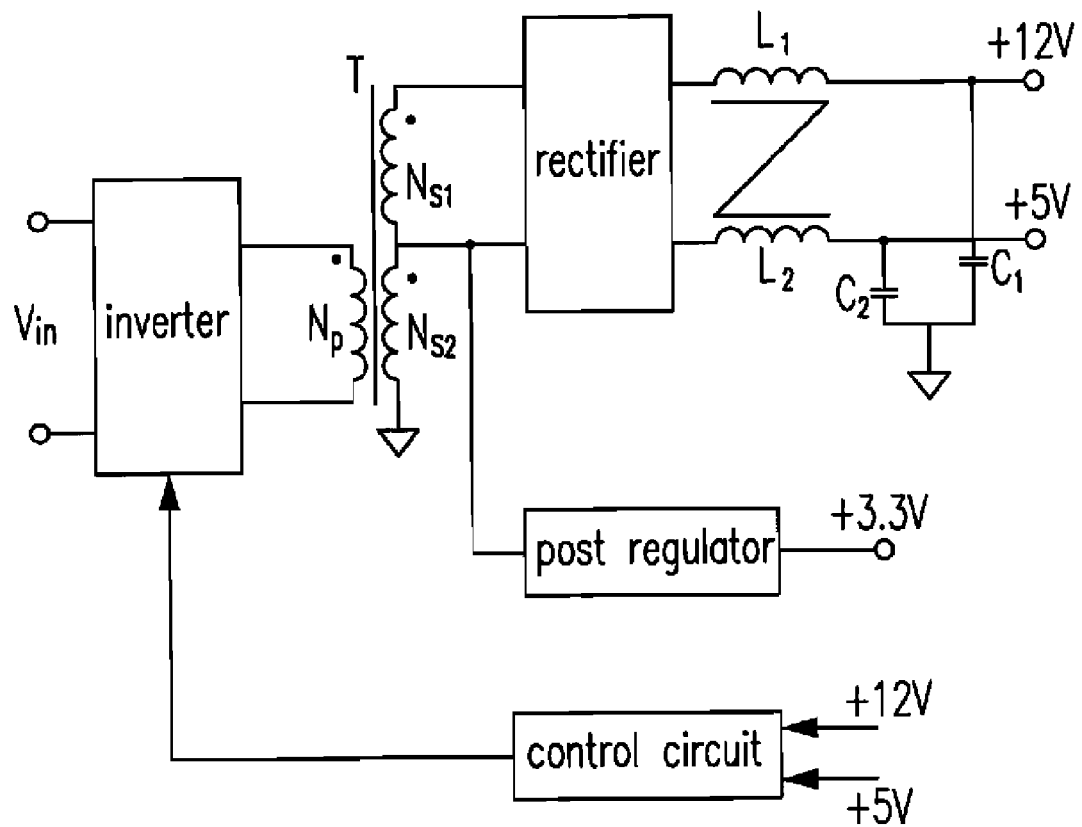
FIG. 1 shows a circuit diagram of a DC/DC converter stage of a desktop computer power supply in the prior art.
Figure 2:
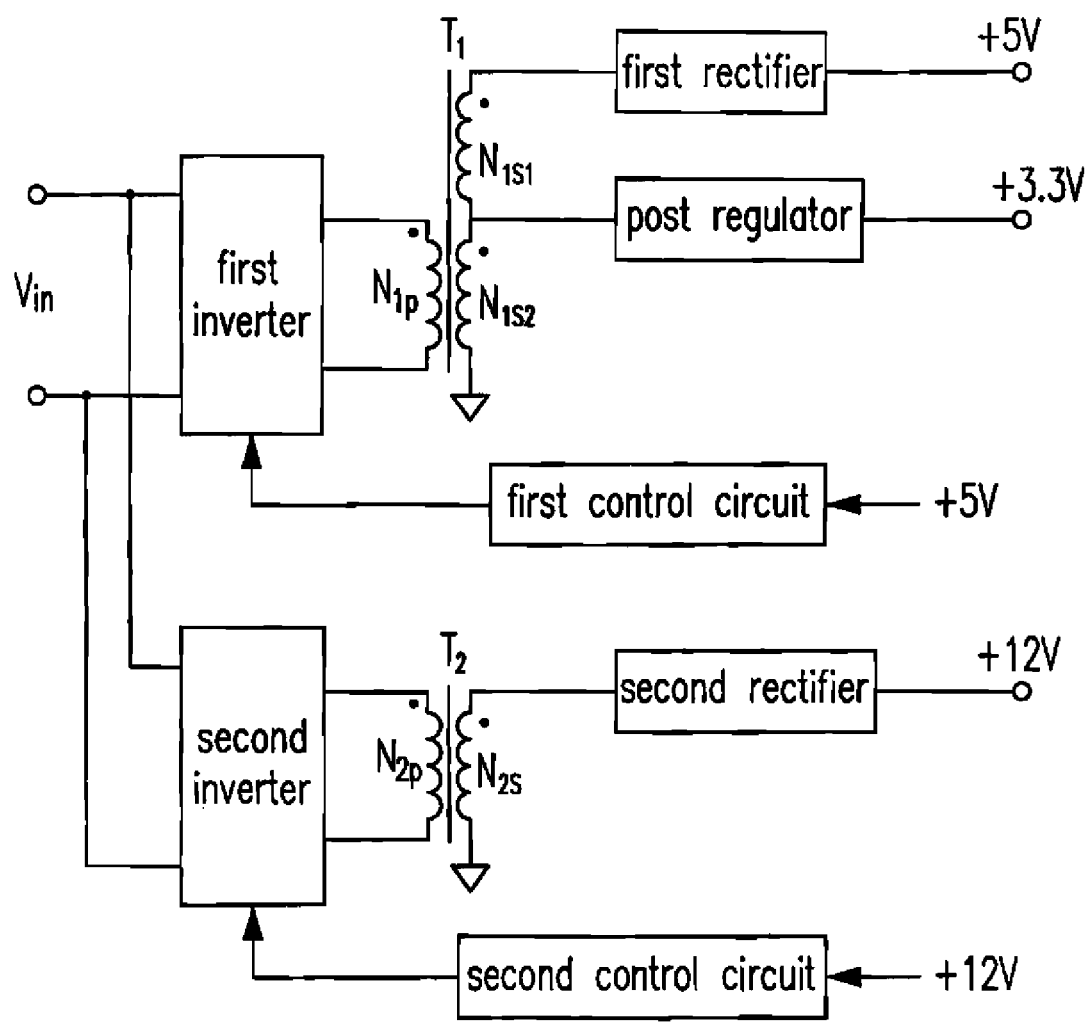
FIG. 2 shows a circuit diagram of a DC/DC converter stage of a workstation computer power supply in the prior art.
Figure 3A:
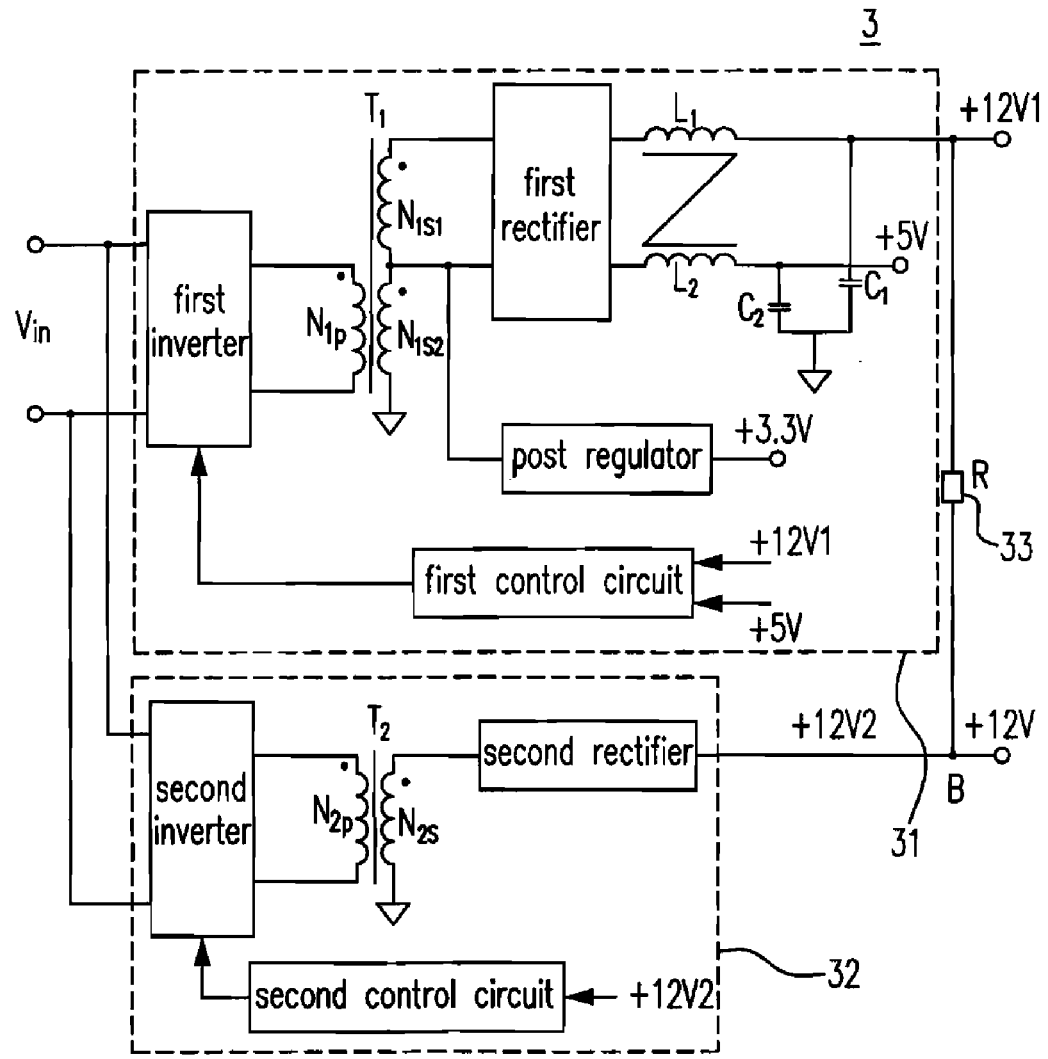
FIG. 3(a) shows a circuit diagram of a DC/DC converter stage of a workstation computer power supply according to the first preferred embodiment of the present invention.

The proposed new technical solution of the present invention is focused on a switched-mode power supply of workstation computer having a large power and multi-outputs such that it could accomplish a relatively high efficiency in wide load, and the design is simplified, cost is also reduced. In the workstation computers, the ratio of output power of +12 V is quite high (usually it is around 80%). The first preferred embodiment of the present invention is shown in FIG. 3(a). A DC/DC converter stage 3 includes a multi-outputs converter 31 (it is a DC/DC converter), a single-output converter 32 (it is also a DC/DC converter) and a resistive element 33. In which, the multi-outputs converter 31 includes a first inverter, a first transformer T1 having a first primary winding N1$p$ coupled to the first inverter, a first secondary winding N1$s$1 and a second secondary winding N1$s$2, a first rectifier coupled to the first secondary winding N1$s$1, a first filter (including a first inductor L1 and a first capacitor C1) and a second filter (including a second inductor L2 and a second capacitor C2) both coupled to the first rectifier and respectively employed to generate output voltages of +12 V and +5 V, a post regulator coupled to a node of the first secondary winding N1$s$1 and the second secondary winding N1$s$2, and generating an output voltage of +3.3 V and a first control circuit coupled to the first inverter, receiving output voltages of +12 V1 and +5 V and generating a first control signal (not shown). The single-output converter 32 includes a second inverter, a second transformer T2 having a second primary winding N2$p$ coupled to the second inverter and a third secondary winding N2$s$, a second rectifier coupled to the third secondary winding N2$s$ and generating an output voltage of +12 V2 and a second control circuit coupled to the second inverter, receiving the output voltage of +12 V2 and generating a second control signal (not shown). The single-output converter 32 provides most part of the output load power of +12 V, and the heavy-load power of the multi-outputs converter 31 is less than that of the single-output converter 32. The output voltages at the output terminals of the multi-outputs converter 31 are respectively +12 V1, +5 V and +3.3 V, and the output voltage at the output terminal of the single-output converter 32 is +12 V2. +12 V1 and +12 V2 are connected via the resistive element 33 for generating a coupled output having an output power of +12 V.

In the aforementioned first preferred embodiment of the present invention, due to that two converters 31 and 32 are employed to transmit the power, the power has been distributed, and the heat dissipation problem occurred when the power transmitted via a single transformer in the prior art has been effectively solved. Furthermore, most output power of the +12 V are provided by the +12 V2 of the single-output converter 32, the output powers of the +12 V1 and +5V is similar, the interaction between them is slight, and the same control circuit is employed, which resolve the cross regulation problem.

Under heavy-load, the multi-outputs converter 31 and the single-output converter 32 work at the same time, the output power of +12 V is provided by the coupled output terminals of +12 V1 of the multi-outputs converter 31 and +12 V2 of the single-output converter 32, the output powers of +5 V and +3.3 V are provided by the multi-outputs converter 31. Under light load, only the multi-outputs converter 31 works and the outputs of +12 V, +5 V and +3.3 V are still provided by which.

Figure 3B:
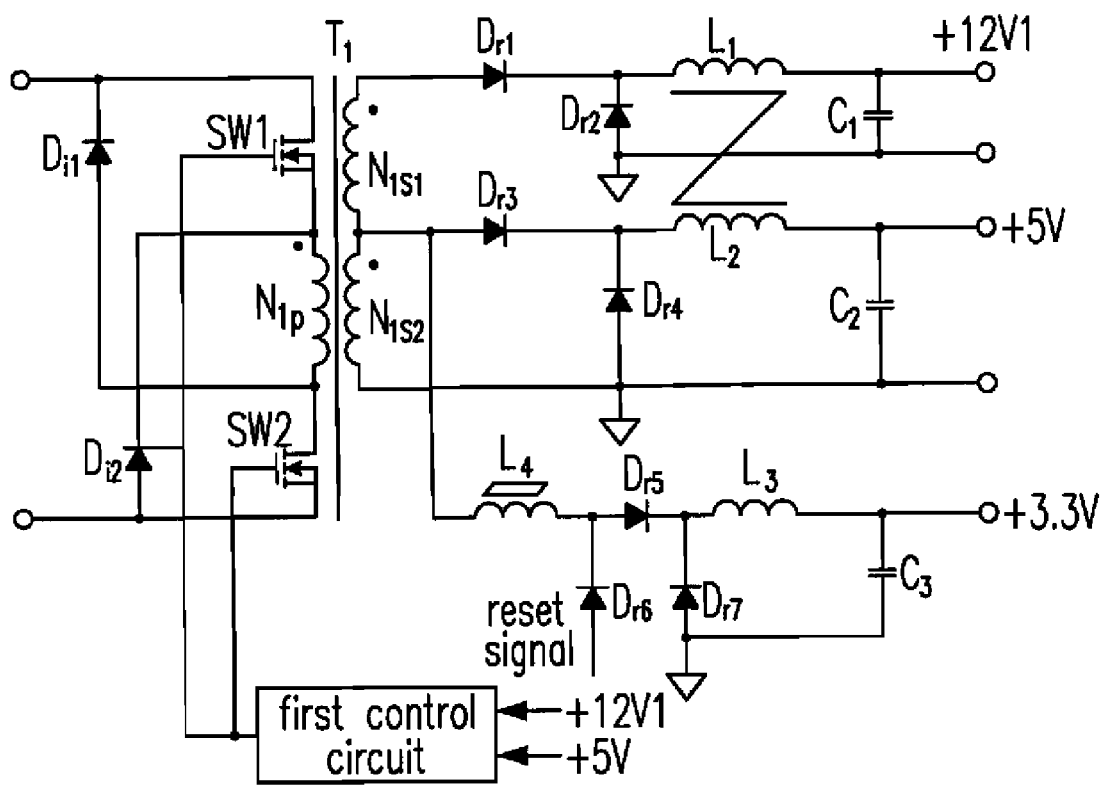
FIG. 3(b) shows a circuit diagram of a multi-outputs converter of the DC/DC converter stage of the workstation computer power supply according to the first preferred embodiment of the present invention.

Due to that the single-output converter 32 having the relatively higher rated power is idle, the unchanged losses (such as the core losses of the transformer and the driving losses of the switches) are significantly decreased, and thus the DC conversion is still maintaining at a relatively high conversion efficiency. Please refer to FIG. 3(b), it shows a circuit diagram of a multi-outputs converter 31 of the DC/DC converter stage of the workstation computer power supply according to the first preferred embodiment of the present invention. In which, the first inverter includes diodes Di1-Di2 and switches SW1-SW2. The first rectifier includes diodes Dr1-Dr4. The post regulator includes diodes Dr5-Dr7, inductors L3-L4 (in which, L4 is a saturation inductor) and a capacitor C3, wherein the diode Dr6 receives an external reset signal.

Figure 3C:
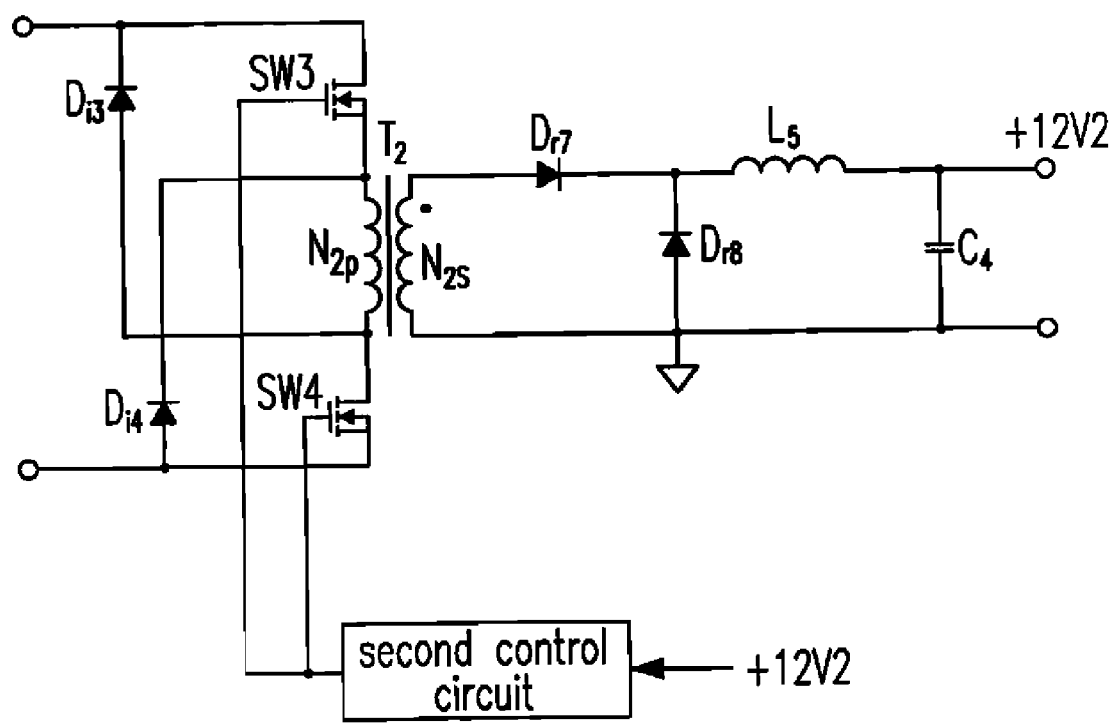
FIG. 3(c) shows a circuit diagram of a single-output converter of the DC/DC converter stage of the workstation computer power supply according to the first preferred embodiment of the present invention.

Referring to FIG. 3(c), it shows a circuit diagram of a single-output converter 32 of the DC/DC converter stage of the workstation computer power supply according to the first preferred embodiment of the present invention. In which, the second inverter includes diodes Di3-Di4 and switches SW3-SW4. The second rectifier includes diodes Dr7-Dr8, an inductor L5 and a capacitor C4.

Figure 4:
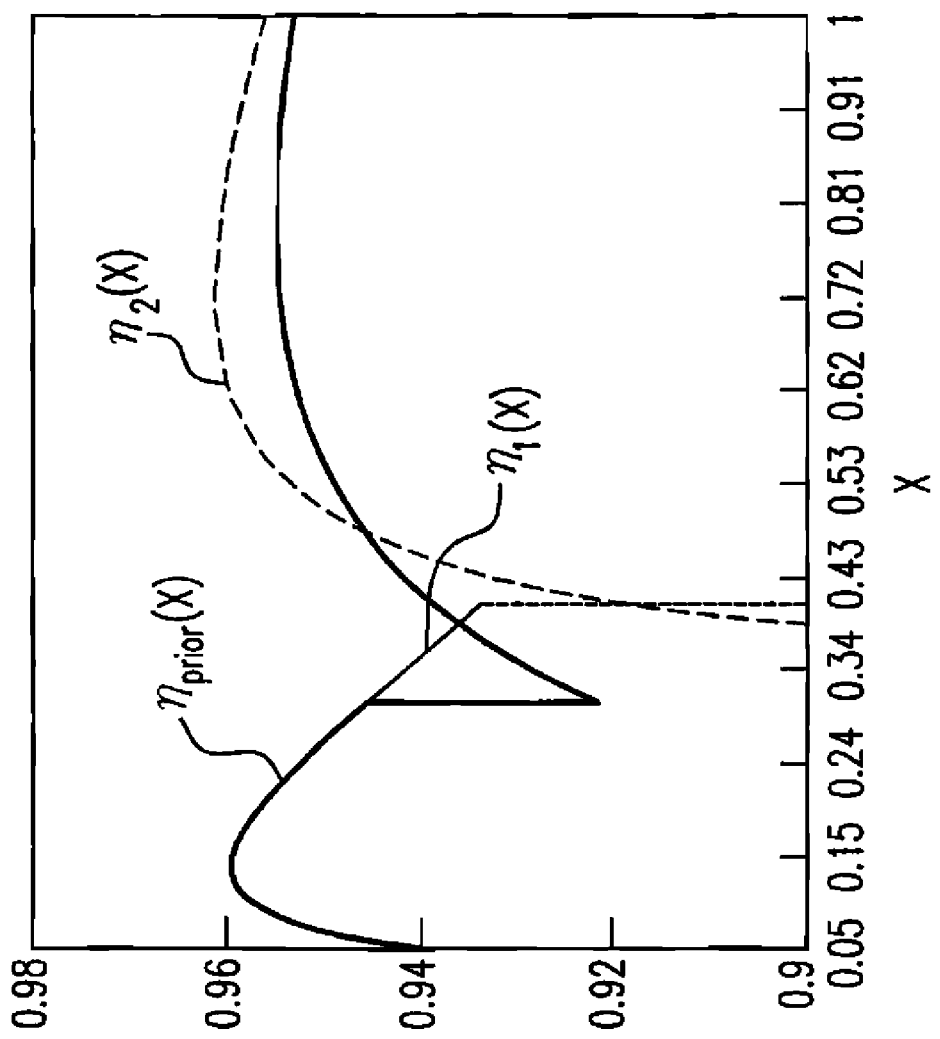
FIG. 4 shows a working efficiency diagram of two DC/DC converters electrically connected in parallel in the prior art.

While the controlling strategy in the prior art of two converters work momentarily employed to the circuit of the present invention, only the multi-outputs converter 31 works in the light-load; the single-output converter 32 begins to work when the total output power to the load increasing to a preset level, the multi-outputs converter 31 works under a current-limiting status and output a constant value power, and the output power of the single-output converter 32 is gradually increased from zero to match the load power requirement other than the constant value power supplied by converter 31. Under this kind of controlling method, the efficiency curve of the DC/DC converter stage 3 is shown in FIG. 4, in which the X-axis is the power percentage of workstation rated power, $\eta1(x)$ is the efficiency curve of the multi-outputs converter 31, $\eta2(x)$ is the efficiency curve of the single-output converter 32, and $\eta prior(x)$ is the efficiency curve of the DC/DC converter stage 3 when the controlling strategy in the prior art is employed. When the single output converter 32 begins to work, its efficiency is relatively quite low since the single output converter 32 is under an extremely light-load. Please refer to the $\eta2(x)$ curve in FIG. 4, the total output efficiency of which has fallen a great deal, which against the accomplishment of high efficiency keeping in the wide load range, and the controlling result of which is shown in FIG. 4. In FIG. 4, one with an ordinary skill in the field would know that $\eta prior(x)=(\eta1(x)*\text{load ratio of converter } 31+\eta2(x)*\text{load ratio of converter } 32)/\text{input power}$.

Figure 5:
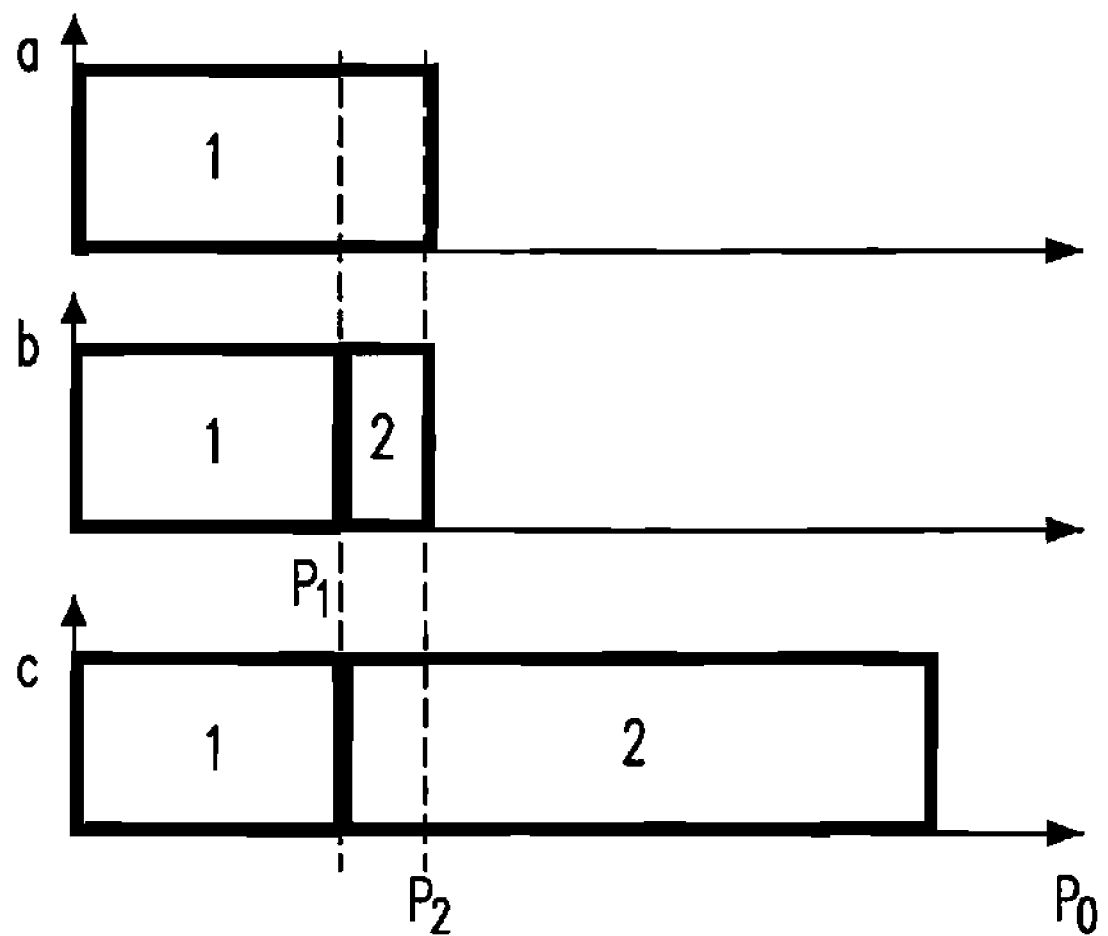
FIG. 5 shows a work collaboration diagram of two converters in a load range according to a controlling strategy of the first preferred embodiment of the present invention.
Figure 6:
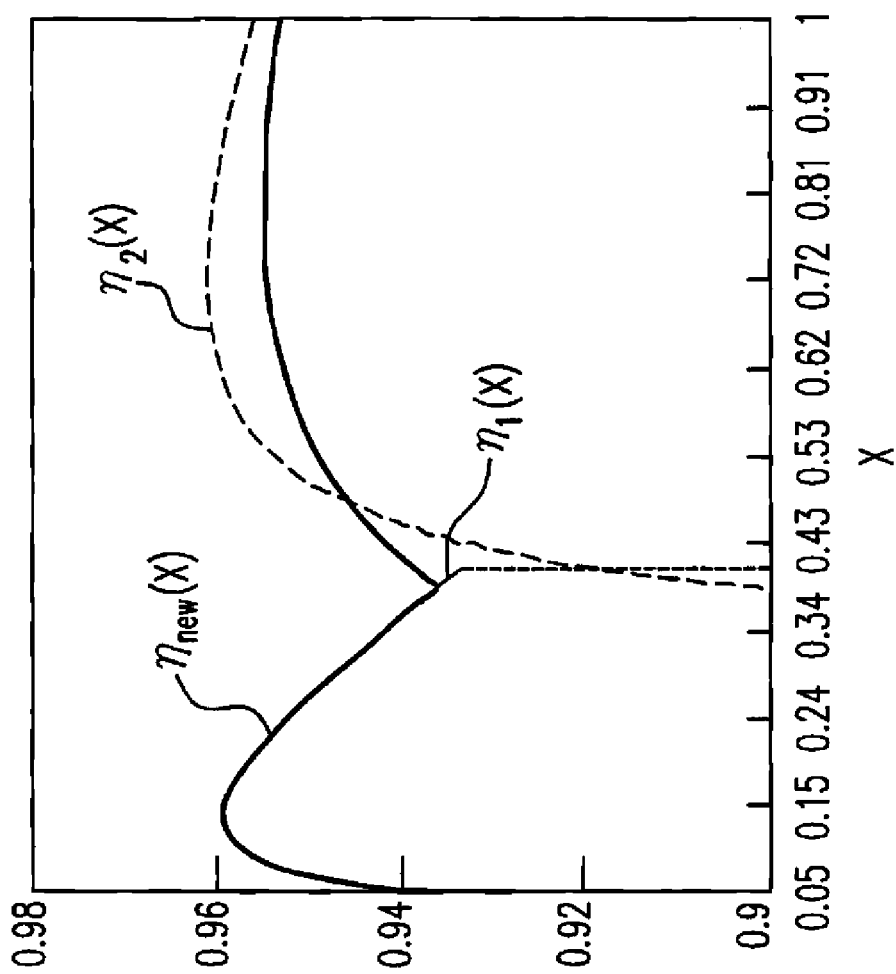
FIG. 6 shows a working efficiency diagram of two DC/DC converters electrically connected in parallel according to a controlling strategy of the first preferred embodiment of the present invention.

A new controlling strategy is proposed in the present invention so as to keep a relatively high efficiency in the whole load range. As shown in FIG. 5, the X-axis P0 indicates a transient output power of a coupled output terminal B (as shown in FIG. 3(a), it is a node), P2 is the rated power of multi-outputs converter 31, and P1 is the current-limiting output power of the multi-outputs converter 31. When the load of the output terminal B is light (P0<P2), only the multi-outputs converter 31 works, and the single-output converter 32 is idles. When P0>P2, the single-output converter 32 begins to work, meanwhile the output power of the multi-outputs converter 31 drops to P1 and works in the current-limiting status (P1<P2). Observing from the efficiency curves of FIG. 5, when the output power of the multi-outputs converter 31 decreases to P1, the single-output converter 32 has the output power of P0-P1, and that is to say the single-output converter 32 has an output power of P2-P1 once it turns on. Since the single-output converter 32 has a adequate load when it begins to work, the two converters 31 and 32 are both work under a high-efficiency status, and thus in transition from period single multi-outputs converter 31 works to both the multi-outputs converter 31 and the single-output converter 32 work, the efficiency drop of the DC/DC converter stage 3 is relatively small. The controlling result can be understood by observing the efficiency curve of FIG. 6. In FIG. 6, one with an ordinary skill in the field would know that $\eta new(x)=(\eta1(x)*\text{load ratio of converter } 31+\eta2(x)*\text{load ratio of converter } 32)/\text{input power}$. In which, $\eta new(x)$ is the efficiency curve of the DC/DC converter stage 3 when a new controlling strategy proposed by the present invention is employed. When the new controlling strategy proposed by the present invention is employed, power converter (the single-output converter 32) will not work under an extremely light-load status, and thus great efficiency drop will disappear.

Figure 7:
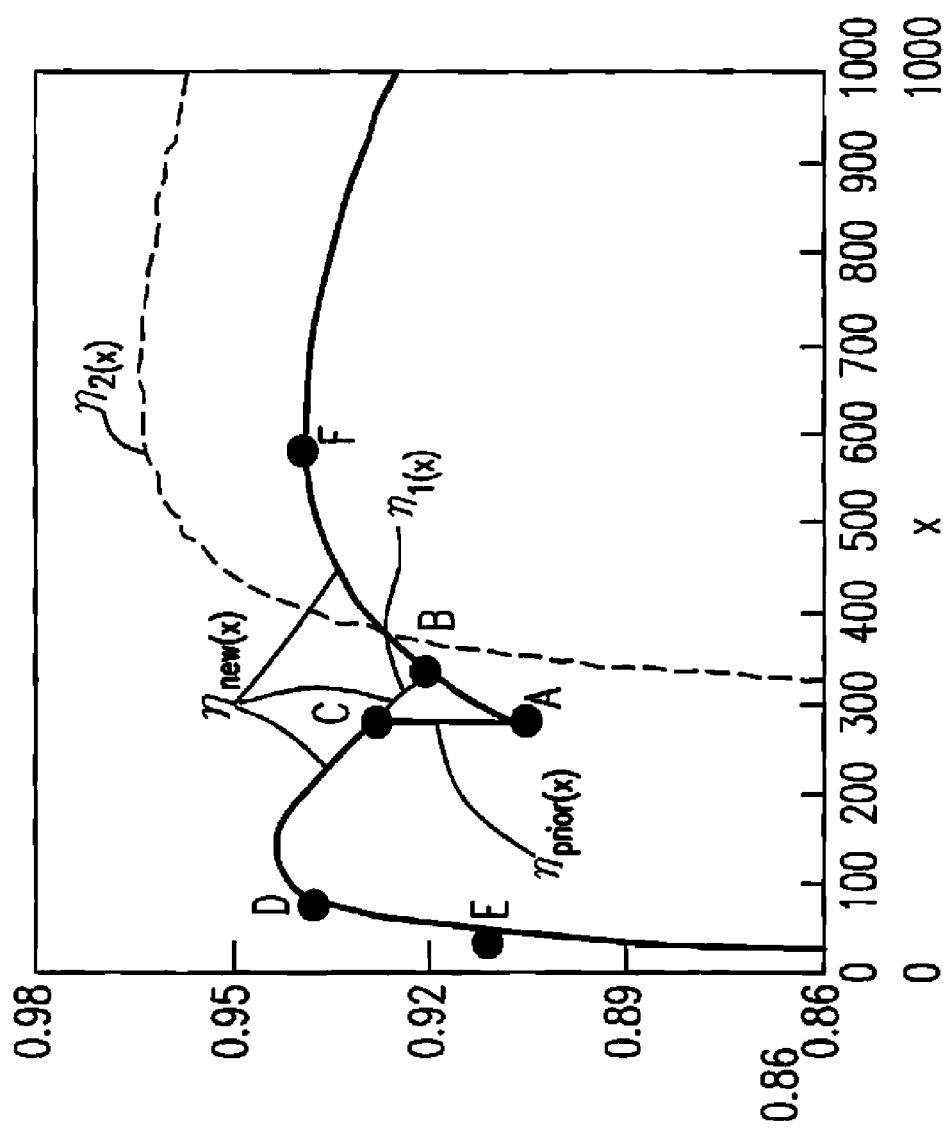
FIG. 7 shows a comparison diagram of working efficiencies of two DC/DC converters according to a structure and the controlling strategy of the first preferred embodiment of the present invention and those of the present structure and the controlling strategy in the prior art.

FIG. 7 is the controlling description of the present invention, its vertical-Axis is the efficiency, and its X-axis is the sum of the power output of two converters 31 and 32. In FIG. 7, a path E-D-C-B is the efficiency curve $\eta new(x)$ of the +12 V output, in which the portion of E-D-C is overlapped with the single converter efficiency curve $\eta1(x)$. Please also refer to FIG. 5 at the same time. In FIG. 5, P1 is the current-limiting output power of +12 V1 of the multi-outputs converter 31, and P2 is the rated power of +12 V1 of the multi-outputs converter 31. When the controlling method in the prior art is employed to the circuit of the present invention as shown in FIG. 3(a), the efficiency curve is $\eta prior(x)$, the efficiency path is E-D-C-A-B-F, and the +12 V1 output power of the multi-outputs converter 31 is P1 and the +12 V2 output power of the single-output converter 32 is 0 while locating at point C of the path E-D-C-A-B-F. The sum of the two converters 31 and 32, P0, increases continuously, it moves to the right-hand side of the X-axis (please combine FIG. 5 and FIG. 7 to observe), when P0>P1, the +12 V1 output power of the multi-outputs converter 31 is under the current-limiting status, and the output power is P1, the output power of the single output converter 32 (its efficiency curve is $\eta2(x)$) is increased gradually and starting from zero, and the total output efficiency is momentarily pulls down to point A. When the controlling method of the present invention is employed to the circuit of the present invention as shown in FIG. 3(a), the efficiency curve is $\eta new(x)$, the efficiency path is E-D-C-B-F, and the multi-outputs converter 31 is under a critical status of having the +12 V1 output power value of P2 and the single-output converter 32 is under a critical status of switching between turn-on/turn-off while locating at point B of the path E-D-C-B-F. The output power of +12 V2 of the single-output converter 32 is P2-P1 once it turns on. At that time, the output power +12 V1 of the multi-outputs converter 31 jumps from its rated output power P2 to its current-limiting output power P1. Following the sum of powers of the two converters 31 and 32, P0, increases continuously, it moves to the right-hand side the X-axis, the +12 V1 output power of the multi-outputs converter 31 is maintaining at the current-limiting status, and the output power of the single output converter 32 is P0-P1. Observing from FIG. 7, the efficiency difference between the value of point B and that of point A tells the advantage of employing the present invention: the increase of efficiency.

According to the above-mentioned descriptions, a large power switched-mode power supply having a relatively higher efficiency in a load range is provided, and it employs a parallelized structure including a multi-outputs converter and a single-output converter, effectively increases the light-load efficiency of the power supply, and resolves the heat dissipation problem of the transformers and the cross regulation problem of the multi-outputs converters.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A switched-mode power supply, comprising:
a first output converter receiving a DC input voltage and generating a first high power DC voltage output and at least one low power DC voltage output; and
a second output converter receiving the DC input voltage and generating a second high power DC voltage output coupled to the first high power DC voltage output to generate a coupled output,
wherein the first output converter works and the second output converter idles when a transient power of the coupled output is less than a predetermined power level, and both the first and the second output converters work when the transient power is larger than the predetermined power level, wherein the first output converter is a multi-outputs converter, the second output converter is a single-output converter, the at least one low power DC voltage output comprises a first low power DC voltage output and a second low power DC voltage output, and the multi-outputs converter comprises:
a first control circuit receiving the first high power DC voltage output and the first low power DC voltage output, and generating a first control signal;
a first inverter receiving the DC input voltage and the first control signal, and generating a first AC output voltage;
a first transformer having a first primary winding, a first secondary winding and a second secondary winding, wherein the first primary winding is coupled to the first inverter, each of the first and the second secondary windings has a first terminal and a second terminal, the first terminal of the second secondary winding is coupled to the second terminal of the first secondary winding, and the second terminal of the second secondary winding is grounded;
a first rectifier coupled to the first and the second terminals of the first secondary winding;
a post regulator coupled to the second terminal of the first secondary winding and generating the second low power DC voltage output;
a first filter coupled to the first rectifier and generating the first high power DC voltage output; and
a second filter coupled to the first rectifier and generating the first low power DC voltage output.

2. A power supply according to claim 1 further comprising a resistive element having a first and a second terminals respectively coupled to the first and the second output converters.

3. A power supply according to claim 1, wherein the first output converter generates an output power momentarily dropping to a current limiting output power when the transient power of the coupled output is larger than the predetermined power level, and an output power of the second output converter equals to a difference between the transient power of the coupled output and the current limiting output power when the second output converter is turned on, wherein the current limiting output power is lower than the predetermined power level.

4. A power supply according to claim 1, wherein the first filter comprises a first capacitor and a first inductor, the second filter comprises a second capacitor and a second inductor, the first inductor is magnetically coupled to the second inductor, and both the multi-outputs and the single-output converters are DC/DC converters.

5. A power supply according to claim 1, wherein the single-output converter comprises:
a second control circuit receiving the second high power DC voltage output and generating a second control signal;
a second inverter receiving the DC input voltage and the second control signal, and generating a second AC output voltage;
a second transformer having a second primary winding and a third secondary winding, wherein the second primary winding is coupled to the second inverter, the third secondary winding has a first and a second terminals, and the second terminal of the third secondary winding is grounded; and
a second rectifier coupled to the first terminal of the third secondary winding and generating the second high power DC voltage output.

6. A switched-mode power supply, comprising:
a first output converter receiving an input voltage and generating a first high power voltage output; and
a second output converter receiving the input voltage and generating a second high power voltage output coupled to the first high power voltage output to generate a coupled output,
wherein the first output converter works and the second output converter idles when a transient power of the coupled output is less than a predetermined power level, and both the first and the second output converters work when the transient power is larger than the predetermined power level, wherein the first output converter is a multi-outputs converter, the second output converter is a single-output converter, and the multi-outputs converter comprises:
a first control circuit receiving the first high power voltage output and a first low power voltage output, and generating a first control signal;
a first inverter receiving the input voltage and the first control signal and generating a first AC output voltage;
a first transformer having a first primary winding, a first secondary winding and a second secondary winding, wherein the first primary winding is coupled to the first inverter, each of the first and the second secondary windings has a first terminal and a second terminal, the first terminal of the second secondary winding is coupled to the second terminal of the first secondary winding, and the second terminal of the second secondary winding is grounded;
a first rectifier coupled to the first and the second terminals of the first secondary winding;
a post regulator coupled to the second terminal of the first secondary winding and generating a second low power voltage output;
a first filter coupled to the first rectifier and generating the first high power voltage output; and
a second filter coupled to the first rectifier and generating the first low power voltage output.

7. A power supply according to claim 6 further comprising a resistive element having a first and a second terminals respectively coupled to the first and the second output converters, wherein an output power of the first output converter momentarily drops to a current limiting output power when the transient power of the coupled output is larger than the predetermined power level, and an output power of the second output converter equals to a difference between the transient power of the coupled output and the current limiting output power when the second output converter is turned on, wherein the current limiting output power is lower than the predetermined power level.

8. A power supply according to claim 6, wherein the single-output converter comprises:
   a second control circuit receiving the second high power voltage output and generating a second control signal;
   a second inverter receiving the input voltage and the second control signal, and generating a second AC output voltage;
   a second transformer having a second primary winding and a third secondary winding, wherein the second primary winding is coupled to the second inverter, the third secondary winding has a first and a second terminals, and the second terminal of the third secondary winding is grounded; and
   a second rectifier coupled to the first terminal of the third secondary winding and generating the second high power voltage output.

9. A controlling method for a switched-mode power supply as recited in claim 6 comprising steps of:
   causing the first output converter to work and the second output converter to idle when a transient power of the coupled output is less than a predetermined power level; and
   causing both the first and the second output converters to work when the transient power is larger than the predetermined power level.

10. A method according to claim 9, wherein the switched-mode power supply further comprises a resistor having a first terminal and a second terminal respectively coupled to the first and the second output converters, both the first and the second output converters receive an input voltage, and the method further comprises steps of:
   causing the first output converter to generate a first and a second low power voltage outputs;
   causing an output power of the first output converter to simultaneously drop to a current-limiting output power when the transient power of the coupled output is larger than the rated output power; and
   causing an output power of the second output converter to equal to a difference between the transient power of the coupled output and the current limiting output power when the second output converter is turned on.

11. A method according to claim 10, wherein the input voltage is a DC input voltage, the first and the second high power voltage outputs are both high power DC voltage outputs, and the first and the second low power voltage outputs are both low power DC voltage outputs.

12. A method according to claim 10, wherein the first output converter is a multi-output converter, and the second output converter is a single-output converter.

13. A method according to claim 9, wherein the switched-mode power supply further comprises a resistor having a first terminal and a second terminal respectively coupled to the first and the second output converters, both the first and the second output converters receive an input voltage, the first and the second high power voltage outputs are both high power DC voltage outputs, and the method further comprises a step of:
   causing the first output converter to generate at least one low power voltage output.

14. A method according to claim 13, wherein the input voltage is a DC input voltage and the at least one low power voltage output comprises a first low power voltage output and a second low power voltage output.

15. A method according to claim 13, wherein the first output converter is a multi-output converter, and the second output converter is a single-output converter.

* * * * *